United States Patent
Chandrashekaraiah (10) Patent No.: US 12,045,467 B2
(45) Date of Patent: Jul. 23, 2024

(54) DYNAMIC MEMORY DEVICE MANAGEMENT AND STREAM PRIORITIZATION BASED ON QUALITY OF SERVICE METRICS

(71) Applicant: Micron Technology, Inc., Boise, ID (US)

(72) Inventor: Manjunath Chandrashekaraiah, Folsom, CA (US)

(73) Assignee: MICRON TECHNOLOGY, INC., Boise, ID (US)

( * ) Notice: Subject to any disclaimer, the term of this patent is extended or adjusted under 35 U.S.C. 154(b) by 122 days.

(21) Appl. No.: 17/708,811

(22) Filed: Mar. 30, 2022

(65) Prior Publication Data

US 2023/0315295 A1    Oct. 5, 2023

(51) Int. Cl.
G06F 12/00        (2006.01)
G06F 3/06         (2006.01)

(52) U.S. Cl.
CPC .......... *G06F 3/0611* (2013.01); *G06F 3/0619* (2013.01); *G06F 3/0635* (2013.01); *G06F 3/0659* (2013.01); *G06F 3/0673* (2013.01)

(58) Field of Classification Search
CPC .... G06F 3/0611; G06F 3/0619; G06F 3/0635; G06F 3/0659; G06F 3/0673
See application file for complete search history.

(56) References Cited

U.S. PATENT DOCUMENTS

| | | | | |
|---|---|---|---|---|
| 11,361,552 | B2* | 6/2022 | Kale | G06N 3/049 |
| 2006/0022054 | A1* | 2/2006 | Elhamias | G06F 3/0679 235/492 |
| 2016/0299697 | A1* | 10/2016 | Chen | G06F 3/0611 |
| 2019/0243771 | A1* | 8/2019 | Mittal | G06F 3/0647 |
| 2019/0379731 | A1* | 12/2019 | Johnsen | H04L 67/1008 |
| 2020/0136996 | A1* | 4/2020 | Li | G06F 12/1081 |
| 2020/0401751 | A1* | 12/2020 | Kachare | G06F 30/347 |
| 2021/0019085 | A1* | 1/2021 | Zhu | G06F 3/0604 |
| 2021/0200568 | A1* | 7/2021 | Sharma | G06F 9/44505 |
| 2021/0200703 | A1* | 7/2021 | Simionescu | G06F 13/4295 |
| 2022/0029929 | A1* | 1/2022 | Jain | H04L 47/803 |
| 2022/0091754 | A1* | 3/2022 | Raman | G06F 3/0613 |
| 2022/0210220 | A1* | 6/2022 | Shivanna | H04L 67/1008 |

* cited by examiner

*Primary Examiner* — David Yi
*Assistant Examiner* — Tahilba O Puche
(74) *Attorney, Agent, or Firm* — NICHOLSON DE VOS WEBSTER & ELLIOTT LLP (57) ABSTRACT

Exemplary methods, apparatuses, and systems including a quality-of-service (QoS) processor for managing performance of a memory device. The QoS processor negotiates a configuration policy with one or more hosts. The QoS processor communicates the configuration policy to a memory device. The QoS processor monitors a workload of the memory device, the workload including one or more requests from the one or more hosts for the memory device to perform a type of computing operation. The QoS processor classifies the workload by comparing the workload to execution parameters of the memory device. The QoS processor computes a projected QoS using the classification of the workload. The QoS processor updates the configuration policy using the projected QoS.

20 Claims, 5 Drawing Sheets

FIG. 5

DYNAMIC MEMORY DEVICE MANAGEMENT AND STREAM PRIORITIZATION BASED ON QUALITY OF SERVICE METRICS

TECHNICAL FIELD

The present disclosure generally relates to quality of service of memory devices, and more specifically, relates to dynamically managing memory devices to allocate virtual or physical functions based on quality of service (QoS) metrics.

BACKGROUND ART

A memory subsystem can include one or more memory devices that store data. The memory devices can be, for example, non-volatile memory devices and volatile memory devices. In general, a host system can utilize a memory subsystem to store data at the memory devices and to retrieve data from the memory devices. Over the lifetime of a memory device, the performance can be affected and the latency, bandwidth, and other attributes of memory operations can negatively impact the performance of the memory device.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Aspects of the present disclosure are directed to a quality of service processor in a memory subsystem. A memory subsystem can be a storage device, a memory module, or a hybrid of a storage device and memory module. Examples of storage devices and memory modules are described below in conjunction with FIG. 1. In general, a host system can utilize a memory subsystem that includes one or more components, such as memory devices that store data. The host system can provide data to be stored at the memory subsystem and can request data to be retrieved from the memory subsystem.

A memory device can be a non-volatile memory device. A non-volatile memory device is a package of one or more dies. One example of non-volatile memory devices is a negative-and (NAND) memory device. Other examples of non-volatile memory devices are described below in conjunction with FIG. 1. The die in the packages can be assigned to one or more channels for communicating with a memory subsystem controller. Each die can consist of one or more planes. Planes can be grouped into logic units (LUN). For some types of non-volatile memory devices (e.g., NAND memory devices), each plane consists of a set of physical blocks, which are groups of memory cells to store data. A cell is an electronic circuit that stores information.

Depending on the cell type, a cell can store one or more bits of binary information, and has various logic states that correlate to the number of bits being stored. The logic states can be represented by binary values, such as "0" and "1", or combinations of such values. There are various types of cells, such as single-level cells (SLCs), multi-level cells (MLCs), triple-level cells (TLCs), and quad-level cells (QLCs). For example, a SLC can store one bit of information and has two logic states.

For some applications, such as an automotive technology system that involves a combination of safety host systems/applications and entertainment host systems/applications, high performance compute and storage solutions are needed. Solid State Drives (SSDs) offer a balance of performance with low cost, low power, and data consolidation as a storage solution in automotive applications. Additionally, with the ever-growing demand for data-intensive safety critical applications and innumerable sensor technology integrations, automotive storage solutions are being required to meet guaranteed quality of service (QoS) metrics, such as meeting and maintaining predictable read and write (R/W) targets required to achieve functional safety goals. While the description refers to automotive examples, other applications such as aviation, high reliability safety equipment, and other systems that leverage SSDs can utilize similar approaches.

Unlike some traditional enterprise applications for SSDs, meeting QoS commitments in automotive technology systems is complex due to multiple non-standardized automotive host system architectures running virtual and non-virtual hosts. The hosts may also run various operating systems in a multiple system on a chip (SoC) environment. These complex and non-standardized architectures present numerous challenges to the underlying SSD in meeting predictable QoS for bandwidth (BW), error reporting, and resource allocation management. The variable requirements of each host with respect to workloads, functional level resource allocation, and virtual function and physical function (VF/PF) impact the QoS significantly. A virtual function is a lightweight version of a Peripheral Component Interconnect Express (PCIe or PCI-E) that provides data transfer only while a physical function is a PCIe or PCI-E that includes data transfer and configuration capabilities. The non-standardized architecture, specifically when operating with a standardized configuration of the underlying SSDs, results in a failure of the SSD to deliver a consistent performance over the entire life of the SSD as it ages and performance degrades. The result is the SSD may fail to respond to one or more hosts, have errors that cause data loss, or degrade host performance.

Aspects of the present disclosure address the above and other deficiencies by implementing QoS monitoring and function management methods for the SSDs. The QoS monitoring and function management provides predictable system level QoS that can be used to control the service provided by the SSDs to the host systems. The QoS monitoring provides performance at a consistent QoS for each host. The QoS monitoring and function management analyzes the QoS commitment made to each host. The QoS monitors a workload profile of the SSD during run time to dynamically supervise and allocate each of PFs and VFs of the SSD to ensure that functional safety applications or critical applications are prioritized in receiving the QoS commitment, which can include bandwidth, latency, and/or response times for read/write operations.

Figure 1:
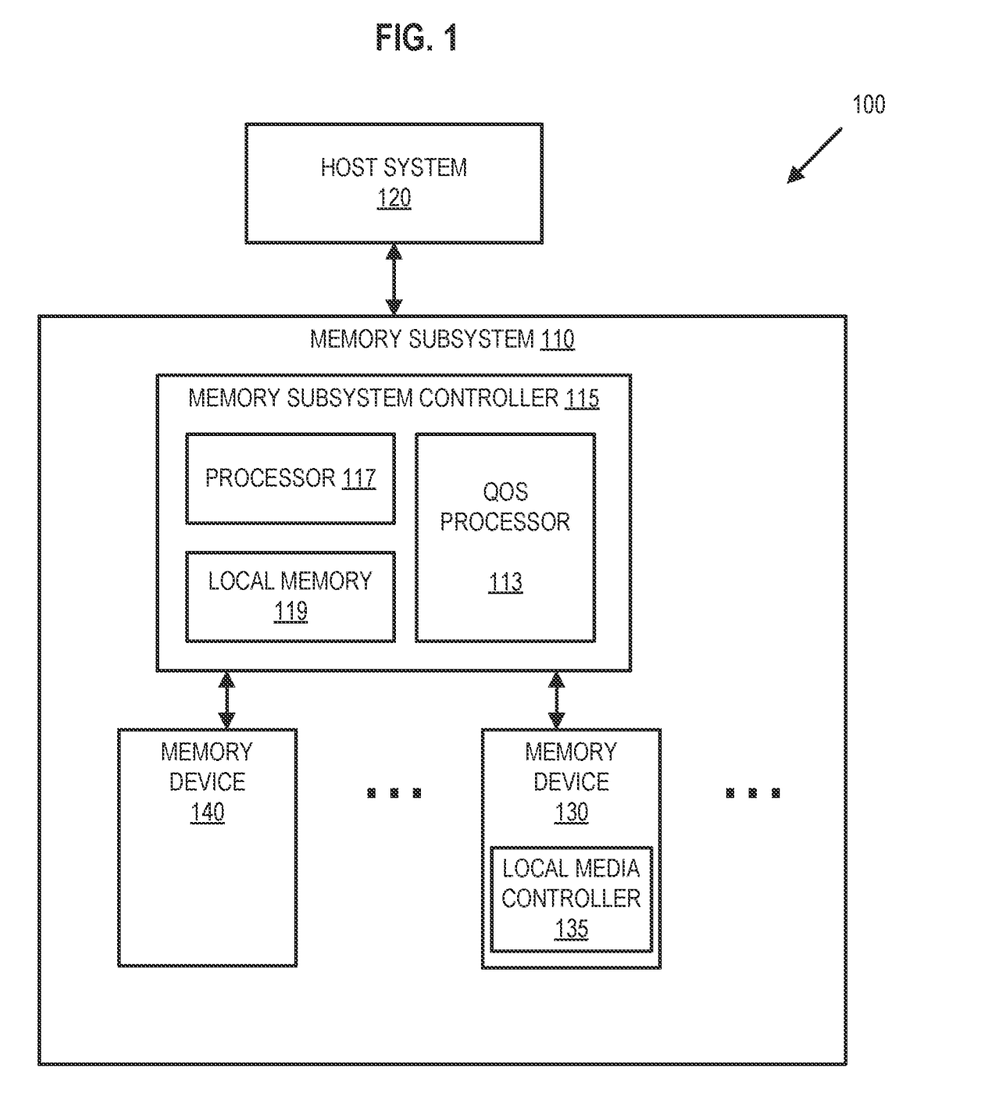
FIG. 1 illustrates an example computing system that includes a memory subsystem in accordance with some embodiments of the present disclosure.

FIG. 1 illustrates an example computing system 100 that includes a memory subsystem 110 in accordance with some embodiments of the present disclosure. The memory subsystem 110 can include media, such as one or more volatile memory devices (e.g., memory device 140), one or more non-volatile memory devices (e.g., memory device 130), or a combination of such.

A memory subsystem 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory subsystems 110. In some embodiments, the host system 120 is coupled to different types of memory subsystems 110. FIG. 1 illustrates one example of a host system 120 coupled to one memory subsystem 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory subsystem 110, for example, to write data to the memory subsystem 110 and read data from the memory subsystem 110.

The host system 120 can be coupled to the memory subsystem 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory subsystem 110. The host system 120 can further utilize an NVM Express (NVMe) interface to access components (e.g., memory devices 130) when the memory subsystem 110 is coupled with the host system 120 by the PCIe interface. The physical host interface can provide an interface for passing control, address, data, and other signals between the memory subsystem 110 and the host system 120. FIG. 1 illustrates a memory subsystem 110 as an example. In general, the host system 120 can access multiple memory subsystems via a same communication connection, multiple separate communication connections, and/or a combination of communication connections.

The memory devices 130 and 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Although non-volatile memory devices such as NAND type memory (e.g., 2D NAND, 3D NAND) and 3D cross-point array of non-volatile memory cells are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

A memory subsystem controller 115 (or controller 115 for simplicity) can communicate with the memory devices 130 to perform operations such as reading data, writing data, or erasing data at the memory devices 130 and other such operations (e.g., in response to commands scheduled on a command bus by controller 115). The memory subsystem controller 115 can include hardware such as one or more integrated circuits and/or discrete components, a buffer memory, or a combination thereof. The hardware can include digital circuitry with dedicated (i.e., hard-coded) logic to perform the operations described herein. The memory subsystem controller 115 can be a microcontroller, special purpose logic circuitry (e.g., a field programmable gate array (FPGA), an application specific integrated circuit (ASIC), etc.), or another suitable processor.

The memory subsystem controller 115 can include a processing device 117 (processor) configured to execute instructions stored in a local memory 119. In the illustrated example, the local memory 119 of the memory subsystem controller 115 includes an embedded memory configured to store instructions for performing various processes, operations, logic flows, and routines that control operation of the memory subsystem 110, including handling communications between the memory subsystem 110 and the host system 120.

In some embodiments, the local memory 119 can include memory registers storing memory pointers, fetched data, etc. The local memory 119 can also include read-only memory (ROM) for storing micro-code. While the example memory subsystem 110 in FIG. 1 has been illustrated as including the memory subsystem controller 115, in another embodiment of the present disclosure, a memory subsystem 110 does not include a memory subsystem controller 115, and can instead rely upon external control (e.g., provided by an external host, or by a processor or controller separate from the memory subsystem 110).

In general, the memory subsystem controller 115 can receive commands or operations from the host system 120 and can convert the commands or operations into instructions or appropriate commands to achieve the desired access to the memory devices 130 and/or the memory device 140. The memory subsystem controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory subsystem controller 115 can further include host interface circuitry to communicate with the host system 120 via the physical host interface. The host interface circuitry can convert the commands received from the host system into command instructions to access the memory devices 130 and/or the memory device 140 as well as convert responses associated with the memory devices 130 and/or the memory device 140 into information for the host system 120.

The memory subsystem 110 can also include additional circuitry or components that are not illustrated. In some embodiments, the memory subsystem 110 can include a cache or buffer (e.g., DRAM) and address circuitry (e.g., a row decoder and a column decoder) that can receive an address from the memory subsystem controller 115 and decode the address to access the memory devices 130.

In some embodiments, the memory devices 130 include local media controllers 135 that operate in conjunction with memory subsystem controller 115 to execute operations on one or more memory cells of the memory devices 130. An external controller (e.g., memory subsystem controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory subsystem 110 includes a QoS processor 113 that can manage performance of a memory device based on QoS metrics. In some embodiments, the controller 115 includes at least a portion of the QoS processor 113. For example, the controller 115 can include a processor 117 (processing device) configured to execute instructions stored in local memory 119 for performing the operations described herein. In some embodiments, a QoS processor 113 is part of the host system 120, an application, or an operating system.

The QoS processor 113 can receive host-defined QoS policy input and perform real-time monitoring of memory device function allocation to identify, analyze, and dynamically prioritize the virtual function and physical function (VF/PF) resource allocation for a given host application request. The QoS processor 113 can analyze a defined workload profile received from the given host during execution time and dynamically supervise and allocate each of PFs and VFs work stream priority. The QoS processor 113 compares the real-time measured workload using an assigned number of VFs and PFs compared to the available VF and PF for each host system. The QoS processor 113 can determine compliance of a workload using the real-time measured workload. For instance, the QoS processor 113 can determine that a workload assigned is not in compliance with QoS because the workload exceeds or otherwise fails to satisfy one or more metrics of the quality of service negotiated with a specific host. The QoS processor 113 can request that the excess workload be rerouted. Further details with regards to the operations of the QoS processor 113 are described below.

Figure 2:
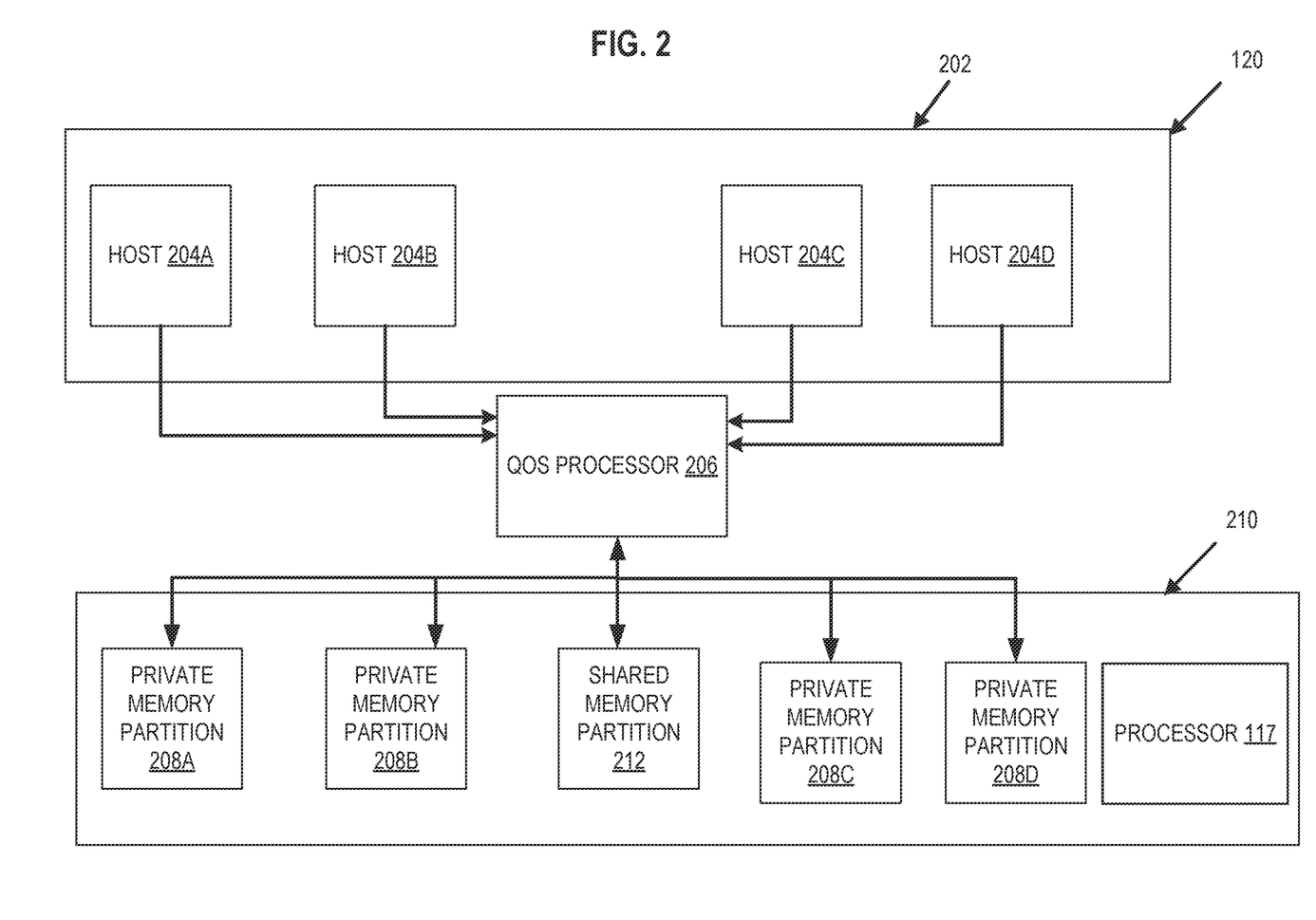
FIG. 2 illustrates an example that includes a multi-host computing architecture, a QoS processor, and multiple storage components in accordance with some embodiments of the present disclosure.

FIG. 2 illustrates an example that includes a multi-host computing architecture, a QoS processor, and multiple storage components of an SSD in accordance with some embodiments of the present disclosure. As illustrated in FIG. 2, an electronic control unit 202 includes multiple hosts 204A-D, such as examples of host system 120, that control the electrical systems or subsystems of the vehicle. The hosts 204A-D are systems or applications that operate under the control of the electronic control unit 202. Examples of the hosts 204A-D systems include transmission control, central timing control, in-vehicle entertainment systems, and advanced driver assistance systems (ADAS). In one example, the hosts 204A-D include an infotainment application 204A, advanced driver assistance system (ADAS) 204B, AI/ML Accelerator 204C, and event recording/sensor fusion application 204D. Collectively, these hosts will be referred to as "hosts 204." In this example, the QoS processor 206 is disposed between the hosts 204 and the private memory partitions 208A-D, collectively referred to private memory partitions 208, and a shared memory partition 212.

Each host 204 may regard a private memory partition 208 as a dedicated memory device for use by that host 204. The private memory partitions 208 can be allocated according to any strategy for allocating physical memory of an SSD. Each of the hosts 204A-D manage configuration policy and perform negotiation with the QoS processor 206 to dynamically determine a configuration policy for the SSD that includes a policy for each host. The configuration policy defines performance attributes including, but not limited to, latency, bandwidth, error reporting, and read/write allocations.

In one example, the private memory partitions 208 are configured using an attribute of the configuration policy. The private memory partitions 208 can be a variable size depending on requirements of the host. In an automotive electronic control unit, various applications (i.e., hosts) such as infotainment application 204A, advanced driver assistance system (ADAS) 204B, AI/ML Accelerator 204C, and event recording/sensor fusion application 204D may have independent storage requirements to size the private memory partitions 208. Additionally, the QoS processor can analyze the criticality of each of the hosts 204. For instance, the infotainment application 204A is not a safety critical system for a vehicle and may be allocated 10% of storage capacity of the SSD with one PF and 4 VF. For another system, such as the ADAS system 204B that is critical for safety of the vehicle that can be allocated 40% of storage capacity of the SSD with 1 PF and 16 VFs. The ADAS 204B may request high bandwidth, memory resources, security locking mechanism for secure access resources (key storage, management functions, etc.) because of the system criticality for safety functions. The QoS dynamically managing the partitioning and availability of resources prevents one application from starving another while achieving consistent IOPs and bandwidth delivery.

The QoS processor 206 communicates with each of the hosts 204 and the memory partitions 208A-D. The QoS processor 206 is configured to negotiate a configuration policy with each of the hosts 204 based on the underlying physical device capabilities of the SSD 210. In one example, the QoS processor 206 receives one or more requested QoS metrics from each host including a bandwidth, latency, and/or read/write requirements. The QoS processor 206 compares the requested QoS metrics from other hosts 204 and the physical capabilities of the SSD 210. The negotiation of the configuration policy includes the QoS processor 206 allocating parameters of the SSD 210 to each of the hosts to satisfy the QoS metrics requested by each of the hosts 204. After completion of the negotiation, the hosts 204 assign the configuration policy defining execution parameters including, but not limited to a payload size (Pz), a default VF count ($VF_c$), a physical count ($PF_c$), a device response latency, which can be broken down into latency of virtual functions $L_{VF}$ and latency of physical functions $L_{PF}$, I/O operations (IOPs), and bandwidth (BW).

After negotiation and policy assignment, the hosts 204 begin requesting compute operations from the SSD 210. The workload requested by each of the hosts 204 will depend on the type of host and the task being performed. For instance, an infotainment application may require high levels of read operations and a low latency while the event recording/sensor fusion may require high levels of write operations and higher latency is acceptable. The ADAS application may require low latency and high bandwidth due to the nature of the safety-critical tasks being performed.

The QoS processor 206 monitors the performance of the SSD 210 by asynchronously classifying the workload of the SSD and computes a projected QoS metric. In one example, the QoS processor 206 can classify the workload using the allocated VFs and PFs during run time. The classification of the workload is dynamic and will change throughout the execution of compute operations. In some examples, the QoS processor 206 determines the classification of workload. The classification can be assigned a weighting factor at configurable levels such as 20%, 50%, 75%, or 90% of bandwidth consumption. The QoS processor 206 computes a resource optimization to accommodate the workload classification by allocating the VF/PF pool of available resources to each host according to the workload and incoming requests to perform compute operations and according to the negotiated configuration policy/QoS. The QoS processor 206 communicates the VF/PF allocation to each of the hosts 204 to ensure that each of the hosts 204 are aware of the VF/PF allocation.

In a non-limiting example, the QoS processor can compute the workload classification ($W_c$) from a relationship of the execution parameters payload size (Pz), a default VF count ($VF_c$), a physical count ($PF_c$), a device response latency, which can be broken down into latency of virtual functions ($L_{VF}$) and latency of physical functions ($L_{PF}$), I/O operations (IOPs), and bandwidth (BW) by computing $$Wc = \frac{Pz}{VF_c + PF_c} * \left[\frac{1}{IOPs} * (L_{VF} + L_{PF})\right] + \frac{1}{BW}.$$

In some embodiments, the QoS available to the hosts 204 is insufficient or undesirable to one or more of the hosts 204. Examples of conditions that can lead to insufficient QoS include an aging SSD 210, a surge in operations that put excessive wear on the SSD 210, or adverse environmental conditions which reduce the performance available from the SSD 210. The QoS processor 206 identifies this during normal monitoring and workload classification as described above. The QoS processor 206 or one of the hosts 204 can request to renegotiate the configuration policy in response to a change in VF/PF availability, physical parameters of the SSD, or a change in requirement of a host. In some examples of a workload that exceeds the capability of the SSD, the configuration policy includes a ranking that prioritizes a critical system over other non-critical systems, such as prioritizing the ADAS system while increasing the latency of writing sensor data to the SSD 210 to accommodate the ADAS. In other examples, the AI/ML accelerator is deprioritized in favor of the infotainment application and ADAS. The hosts 204 and the QoS processor 206 can determine a new commitment based on the updated negotiation. The iterative nature of the monitoring and updating negotiations provides a robust defense for aging devices that are still able to deliver at the updated QoS that the hosts 204 have negotiated with the QoS processor. By adjusting the QoS over the life of the SSD 210, the functional life of the SSD 210 is increased and the hosts 204 are more likely to receive the QoS from the SSD 210 or determine that, due to reprioritization by the QoS processor 206, the host should use a different storage device.

In some examples, the QoS processor may configure the SSD 210 to reject requests from one of the hosts 204 when the projected QoS is below an acceptable threshold QoS. For example, the QoS processor 206 negotiated one or more QoS metrics for the SSD 210 with each of the hosts 204. After the negotiation, one of the hosts 204 can send a request for an additional computing operation that exceeds the negotiated QoS between the hosts 204 and the QoS processor 206. If the QoS processor determines that the subsequent request would result in a projected QoS that fails to satisfy the committed QoS to one or more hosts 204, the QoS processor 206 can instruct the SSD 210 to reject the request and communicate to the host 204 (that communicated the subsequent request) that the request has been rejected to prevent overloading of the SSD 210 or otherwise to avoid a failure to satisfy QoS.

Figure 3:
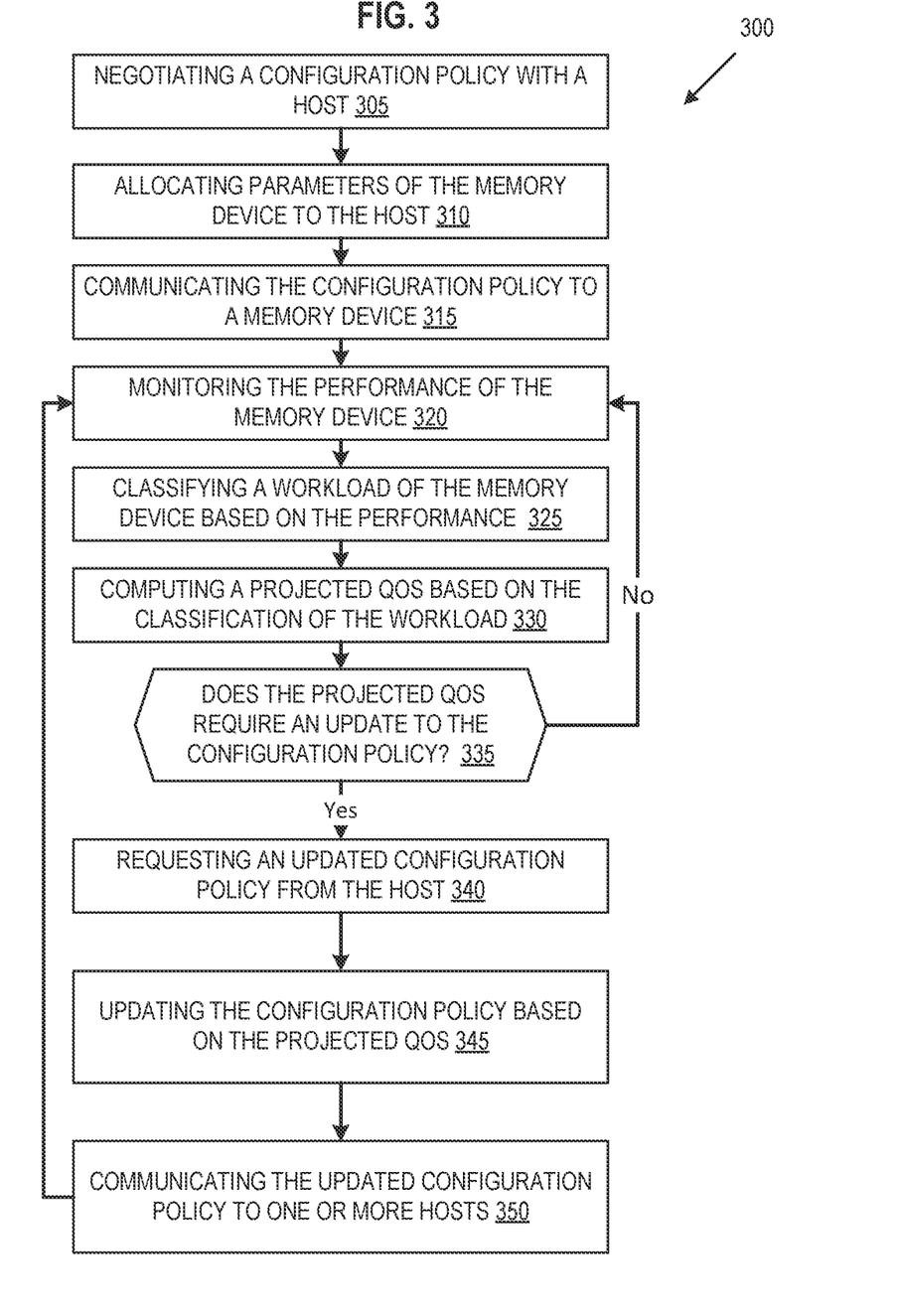
FIG. 3 is a flow diagram of an example method of device management and stream prioritization of memory devices based on QoS metrics in accordance with some embodiments of the present disclosure.

The SSD 210 can include multiple private partitions 208A-D that can be dedicated to a particular host. In some configurations, the SSD 210 can be configured with a shared memory partition 212 that can be made available to two or more of the hosts 204. FIG. 3 is a flow diagram of an example method 300 of managing memory devices performance based on QoS metrics in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the QoS processor 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 305, the QoS processor negotiates a configuration policy with a host. The QoS processor can negotiate a performance requirement for each host. The performance requirement for each host is determined by analyzing the type of computing operations and metrics for successful operation of the host system. During the negotiation, the QoS processor receives one or more requested QoS metrics or parameters including but not limited to: bandwidth, latency, and/or read/write operations. The QoS processor evaluates the requested QoS metrics in comparison to the physical capabilities of the memory device and the requested QoS metrics from one or more other hosts. The QoS processor can commit to the requested QoS metrics, propose alternative QoS metrics based on available capacity of the memory device, or reject the QoS request. For example, a host for a critical system such as ADAS may request a lower latency, faster response time, and/or greater bandwidth while a host for recording sensor data in a transmission control system can accept a higher latency and/or lower bandwidth. The QoS processor can also iteratively negotiate an update to the configuration policy during execution in response to a host requesting a different QoS after the initial negotiation or the QoS processor determining that the memory device will be unable to provide the requested QoS of one or more of the hosts.

At operation 310, the QoS processor allocates parameters such as virtual functions or physical functions of the memory device to each of the hosts according to the negotiation. For example, after the negotiation is completed at operation 305, the QoS processor allocates attributes including, but not limited to a payload size, VF/PF connections, a device response latency, IOPs, or bandwidth.

At operation 315, the QoS processor communicates the configuration policy to a memory device. For example, the QoS processor 113/206 can communicate the configuration policy to the processor 117. After completion of the negotiation, the QoS processor sends the configuration policy to a processor of the memory device. The QoS processor can communicate the configuration policy using known or suitable methods of communication between two processors. The QoS processor may designate private memory partitions for use by each host and a shared partition that is shared between multiple or all of the hosts. The QoS processor defines VFs and PFs of the memory device that are available to each host to comply with performance requirements included in the configuration policy.

At operation 320, the QoS processor monitors the performance of the memory device. The QoS processor monitors the memory device performance by measuring the VF and PF available during execution of the computing operations. The VF and PF availability will vary with the number of compute operations being requested. The QoS processor also measures other attributes of the memory device such as latency, response time, and bandwidth allocations. The QoS processor can perform the monitoring at predetermined intervals, adaptively according to the trend of performance (e.g., more often as the memory device satisfies a performance threshold that indicates it may not satisfy a QoS commitment), or continuously.

At operation 325, the QoS processor classifies a workload of the memory device based on the performance. The QoS processor determines a classification by analyzing the performance attributes of the memory device, e.g., as described above with regard to FIGS. 1-2. The classification can be assigned a weighting factor at configurable levels such as 20%, 50%, 75%, or 90% of total workload availability. The QoS processor can assign the weights based on a pre-defined reserve capacity that is used for surge time intervals to meet QoS without exceeding the physical device limits of the memory device.

At operation 330, the QoS processor computes a projected QoS based on the classification of the workload. In some examples, the QoS processor computes a resource optimization of VF and PF from the workload classification, the VF/PF pool of available resources (e.g., reserve capacity), and the resource loading assessment. The QoS processor projects a QoS that includes attributes of bandwidth allocation, response times for each host, latency for each host, and other factors.

The QoS processor performs resource optimization using attributes and the negotiated QoS. The QoS processor optimizes the resources to achieve consistent performance, I/O latency, bandwidth allocation for each virtual/physical function, memory resources, priority arbitration scheme and run time payload. In one example, the QoS processor can optimize the resources during a 100% IOPs load on the SSD that maximizes the physical performance limits of the SSD. In this example, the QoS processor configures a baseline resource allocation using the configuration policy to provide each host with the negotiated QoS. During execution, the QoS processor measures run time loading between two time intervals. For example, for a vehicle, ADAS includes multiple sensors and subroutines such as a subroutine to assist the driver in staying within a lane, a 360 deg view sensor, a radar sensor, a camera sensor, and other sensors. The ADAS system maps each feed or subroutine to individual virtual functions with a default partition size to satisfy sensor needs (bandwidth, I/O latency, and/or performance). In another example with a non-critical application, the AI/ML Accelerator can include a networking gateway module to provide connectivity to a cloud infrastructure. In this example, the cloud infrastructure can serve as complementary storage as the AI/ML Accelerator may require less memory allocation, less bandwidth, and less stringent latency requirements than ADAS.

During runtime, the QoS processor monitors the execution of operations on the SSD to identify patterns that indicate if the execution parameters or allocations for each of the hosts require adjustments due to, e.g., a change in demand by one of the hosts to perform analytics of sensor data to be reported to the hosts. Using the analytics of the sensor data, one of the hosts may enable deployment of one or more additional safety critical applications. In this example, the QoS processor issues a command to the SSD to report the utilization of resources. The QoS processor analyzes the sensor data and identifies the cluster system and actuator system have underutilized resources that could be reused and reallocated between the AI/ML accelerator and ADAS. After performing reallocation, the QoS processor recomputes the QoS metrics based on reallocated resources to assess any changes to the I/O responsiveness, latency, or other QoS metrics.

At operation 335, the QoS processor determines if the projected QoS requires an updated configuration policy. For example, the QoS processor determines if the projected QoS indicates that an expected workload will exceed the QoS negotiated at operation 305. In response to determining that the QoS will be exceeded, the method 300 proceeds to operation 340 and the QoS processor requests to update the configuration policy from one or more hosts. In response to determining that the QoS will not be exceeded by the expected workload, the method 300 returns to operation 320 and the QoS processor continues to iteratively monitor the performance of the memory device.

In some embodiments, the QoS processor detects that a particular request from a host, such as a request to perform an additional computing operation, will cause the projected quality of service for one or more QoS metrics to fail to satisfy a threshold quality of service. The QoS processor can additional computing operation or request a redirection of the request to another memory device.

At operation 340, the QoS processor requests to update the configuration policy from one or more hosts. Similar to the operations described above at operation 305, the QoS processor requests an updated configuration of QoS metrics using the available capacity of the memory device and the projected QoS. The QoS processor negotiates an updated set of execution parameters including bandwidth, latency, and/or read/write requirements that can be provided at the projected QoS. The negotiation of the updating configuration policy includes the QoS processor re-allocating parameters of the SSD to satisfy the QoS metrics requested by each of the hosts.

At operation 345, the QoS processor updates the configuration policy based on the projected QoS. The QoS processor renegotiates the configuration policy with the host using the projected QoS, e.g., as described with reference to operation 305. The QoS processor updates the configuration policy for the SSD based on the negotiation with the hosts.

At operation 350, the QoS processor communicates the updated configuration policy to one or more hosts. The QoS processor can communicate the configuration policy using known or suitable methods of communication between two processors. For example, the QoS processor can communicate the configuration policy/policies, or a portion of the configuration policy/polices that change as a result of the update. The QoS processor can notify a group of the hosts that have configuration changes as a result of the updated configuration policy. In some embodiments, the QoS processor can notify all the hosts of the updated configuration policy.

Figure 4:
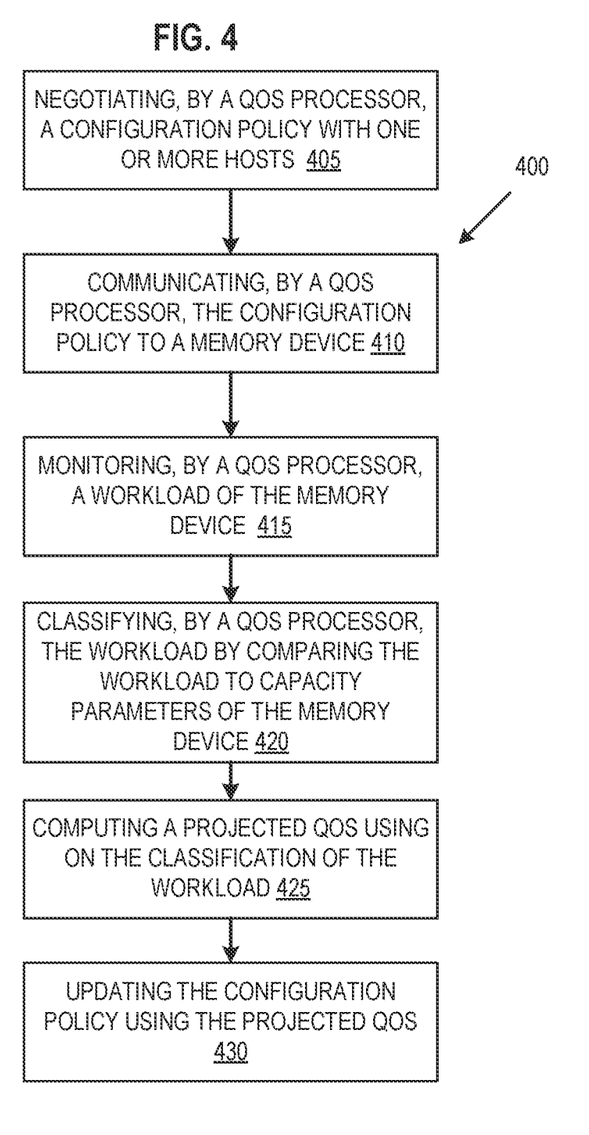
FIG. 4 is a flow diagram of another example method of device management and stream prioritization of memory devices based on QoS metrics in accordance with some embodiments of the present disclosure.

FIG. 4 is a flow diagram of an example method 400 of managing memory devices performance based on QoS metrics in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the QoS processor 113/206 of FIGS. 1-2. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 405, the QoS processor negotiates a configuration policy with one or more hosts. The QoS processor can negotiate a performance requirement for each host based on the operating parameters of the host system's requirements for a dedicated memory device, e.g., as described with reference to operation 305. The QoS processor evaluates the performance requirements of each host and the aggregate of all hosts that have requested performance requirements. The QoS processor evaluates the requested QoS for each host/the aggregate in comparison to the physical capabilities of the memory device and assigns a prioritized QoS for each of the hosts based on the criticality of the system (e.g., a safety system is prioritized over a data collection system) or other prioritization.

At operation 410, the QoS processor communicates the configuration policy to the memory device. For example, the QoS processor can communicate the configuration policy as described with reference to operation 315. The QoS processor can communicate to the memory device that one or more memory partitions are designated for use by a particular host and a shared partition shared by multiple/all hosts. The QoS processor defines VFs and PFs of the memory device that are available to each host to comply with performance requirements included in the configuration policy.

At operation 415, the QoS processor monitors a workload of the memory device. For example, the QoS processor monitors the requests for computing operation received by the memory device from the hosts as described with reference to operation 320. The QoS processor detects a number of virtual functions and physical functions that are allocated to the workload and a total number of virtual functions and physical functions available for allocation. In some embodiments, the QoS processor can determine a baseline, trend information, or other statistical metrics for the workload of the memory device. In one embodiment, the QoS processor performs active monitoring by counting the requests from all of the hosts while removing completed computing operations. The QoS processor can also perform passive monitoring and request activity information from the memory device.

At operation 420, the processing device classifies a workload using a number of virtual and physical functions. The processing device identifies the number of virtual functions and physical functions that are available or assigned to computing tasks. The processing device classifies the workload based on the active virtual functions and physical functions and the total number of virtual functions and physical functions. As described above, an example of the computation can use additional factors including the execution parameters of payload size (Pz), a default VF count ($VF_c$), a physical count ($PF_c$), a latency of virtual functions ($L_{VF}$), a latency of physical functions ($L_{PF}$), I/O operations (IOPs), and bandwidth (BW).

At operation 425, the QoS processor computes a projected QoS using the classification of the workload. For example, the QoS computes a resource optimization of VF and PF from the workload classification as described with reference to operation 335. The projected QoS includes attributes of bandwidth allocation, response times for each host, latency for each host, and other factors.

At operation 430, the QoS processor updates the configuration policy using the projected QoS. For example, the QoS processor updates the configuration policy for each host using the projected QoS, e.g., as described with reference to operation 305. In some embodiments, the QoS processor can update the configuration policy by negotiating an updated configuration policy with the hosts.

The QoS processor can assign a ranking to each of the hosts such that the memory device. The QoS processor assigns the priority from a most critical system (e.g., "1" ranking) to the least critical system (e.g., "n" ranking) to ensure that critical systems continue to receive the negotiated QoS even in surge operation conditions or partial failure conditions. By providing the priority to the memory device, the QoS processor prevents critical systems from receiving performance that is less than the negotiated QoS. The QoS processor can detect, using the monitoring described above, any change in QoS provided to any host and can initiate an updated negotiation.

Figure 5:
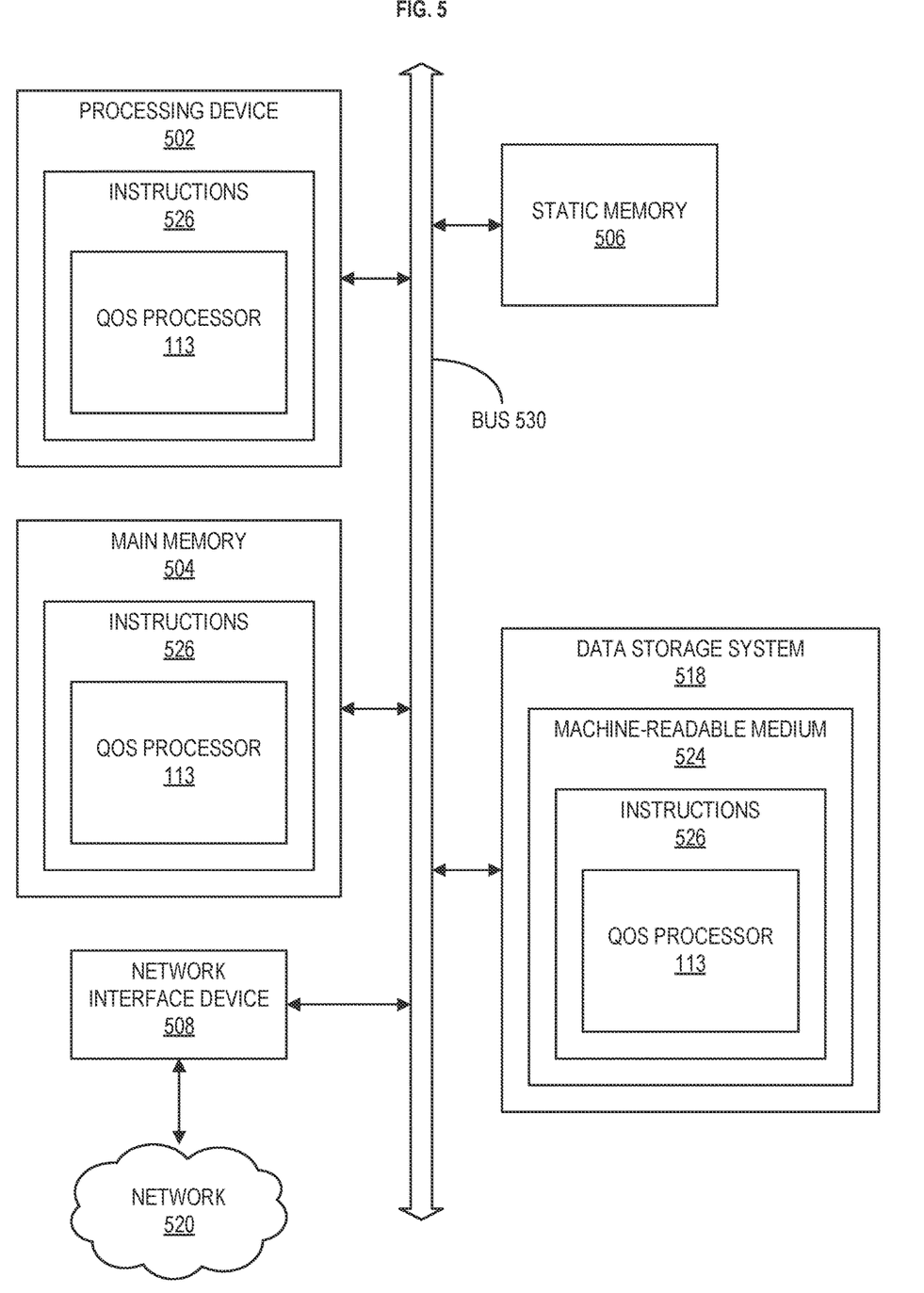
FIG. 5 is a block diagram of an example computer system in which embodiments of the present disclosure may operate.

FIG. 5 illustrates an example machine of a computer system 500 within which a set of instructions, for causing the machine to perform any one or more of the methodologies discussed herein, can be executed. In some embodiments, the computer system 500 can correspond to a host system (e.g., the host system 120 of FIG. 1) that includes, is coupled to, or utilizes a memory subsystem (e.g., the memory subsystem 110 of FIG. 1) or can be used to perform the operations of a controller (e.g., to execute an operating system to perform operations corresponding to the QoS Processor 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage system 518, which communicate with each other via a bus 630.

Processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory subsystem 110 of FIG. 1.

In one embodiment, the instructions 526 include instructions to implement functionality corresponding to a QoS processor (e.g., the QoS processor 113 of FIG. 1). While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. For example, a computer system or other data processing system, such as the memory subsystem controller 115, may carry out the computer-implemented methods 300 or 400 in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
    negotiating, by a QoS processor, a configuration policy with one or more hosts;
    communicating, by the QoS processor, the configuration policy to a memory device;
    monitoring, by the QoS processor, a workload of the memory device, by detecting a number of virtual functions and a number of physical functions that are allocated to the workload and detecting a total number of virtual functions and a total number of physical functions available for allocation, wherein the workload comprises one or more requests from the one or more hosts for the memory device to perform a type of computing operation;
    classifying, by the QoS processor, the workload by comparing the workload to execution parameters of the memory device;
    computing a projected QoS using the classification of the workload; and
    updating the configuration policy using the projected QoS.

2. The method of claim 1, wherein the classifying the workload by comparing the workload to execution parameters of the memory device comprises:
    computing a quality of service for each type of computing operation by comparing one or more execution parameters to a policy defined by the configuration policy;
    determining compliance of the quality of service with the configuration policy by comparing of the one or more execution parameters to the configuration policy;
    in response to determining that the quality of service is not in compliance with the configuration policy, negotiating an updated configuration policy with the one or more hosts; and
    communicating the updated configuration policy to the memory device.

3. The method of claim 2, wherein the configuration policy comprises one or more of a payload size, a virtual function count, a physical function count, or device response latency.

4. The method of claim 3 further comprising:
    classifying the workload using a relationship between the virtual function count, the physical function count, and the payload size; and
    computing the projected QoS using the classification of the workload and the one or more requests.

5. The method of claim 4 further comprising:
    detecting a subsequent request to perform an additional computing operation;
    determining that the subsequent request causes the projected QoS to fail to satisfy a threshold quality of service; and
    communicating a rejection of the subsequent request to the one or more hosts.

6. The method of claim 1, further comprising:
    communicating a priority to the memory device using the classification of the workload, wherein the priority includes a ranking of the one or more hosts, and wherein the ranking is used to determine a latency, a bandwidth, or an order of execution of computing operations associated with the one or more requests from the one or more hosts.

7. The method of claim 1, wherein the one or more requests from the one or more hosts comprises one or more requests from one or more host systems associated with an automotive electronic control unit.

8. A non-transitory computer-readable storage medium comprising instructions that, when executed by a processing device, cause the processing device to:
    negotiate a configuration policy with one or more hosts;
    communicate the configuration policy to a memory device;
    monitor a workload of the memory device, by detecting a number of virtual functions and a number of physical functions that are allocated to the workload and detecting a total number of virtual functions and a total number of physical functions available for allocation, wherein the workload comprises one or more requests from the one or more hosts for the memory device to perform a type of computing operation;
    classify the workload by comparing the workload to execution parameters of the memory device;
    compute a projected QoS using the classification of the workload; and
    update the configuration policy using the projected QoS.

9. The non-transitory computer-readable storage medium of claim 8, wherein the processing device is further caused to:
    compute a quality of service for each type of computing operation by comparing one or more execution parameters to a policy defined by the configuration policy;

determine compliance of the quality of service with the configuration policy by comparing of the one or more execution parameters to the configuration policy; and in response to determining that the quality of service is not in compliance with the configuration policy, negotiating an updated configuration policy with the one or more hosts; and communicating the updated configuration policy to the memory device.

10. The non-transitory computer-readable storage medium of claim 8, wherein the configuration policy comprises one or more of a payload size, a virtual function count, a physical function count, or device response latency.

11. The non-transitory computer-readable storage medium of claim 10, wherein the processing device is further caused to:

classify the workload using a relationship between the virtual function count, the physical function count, and the payload size; and compute a projected QoS based on the classification of the workload and the one or more requests.

12. The non-transitory computer-readable storage medium of claim 11, wherein the processing device is further caused to:

detect a subsequent request to perform an additional computing operation;

determine that the subsequent request causes the projected QoS to fail to satisfy a threshold quality of service; and communicate a rejection of the subsequent request to the one or more hosts.

13. The non-transitory computer-readable storage medium of claim 10, wherein the instructions further cause the processing device to communicate a priority to the memory device using the classification of the workload, wherein the priority includes a ranking of the one or more hosts, and wherein the ranking is used to determine a latency, a bandwidth, or an order of execution of computing operations associated with the one or more requests from the one or more hosts.

14. The non-transitory computer-readable storage medium of claim 10, wherein the one or more requests from the one or more hosts comprises one or more requests from one or more host systems associated with an automotive electronic control unit.

15. A system comprising:

a memory device; and a processing device, operatively coupled to the memory device to:

negotiate a configuration policy with one or more hosts;

communicate the configuration policy to the memory device;

monitor a workload of the memory device, by detecting a number of virtual functions and a number of physical functions that are allocated to the workload and detecting a total number of virtual functions and a total number of physical functions available for allocation, wherein the workload comprises one or more requests from the one or more hosts for the memory device to perform a type of computing operation;

classify the workload by comparing the workload to execution parameters of the memory device;

compute a quality of service for each type of computing operation by comparing the execution parameters to the configuration policy;

determine compliance of the quality of service with the configuration policy by comparing of the execution parameters and the workload to the configuration policy; and in response to determining that the quality of service is not in compliance with the configuration policy, negotiating an updated configuration policy with the one or more hosts; and communicating the updated configuration policy to the memory device.

16. The system of claim 15, wherein the configuration policy comprises one or more of a payload size, a virtual function count, a physical function count, or device response latency.

17. The system of claim 16, wherein the processing device is further caused to:

classify the workload using a relationship between the virtual function count, the physical function count, and the payload size; and compute a projected QoS based on the classification of the workload and the one or more requests.

18. The system of claim 17, wherein the processing device is further caused to:

detect a subsequent request to perform an additional computing operation;

determine that the subsequent request causes the projected QoS to fail to satisfy a threshold quality of service; and communicate a rejection of the subsequent request to the one or more hosts.

19. The method of claim 1, wherein computing the projected QoS using the classification of the workload further comprises:

allocating, according to the configuration policy, the total number of virtual functions and the total number of physical functions available for allocation to the one or more hosts using the classification of the workload and the one or more requests from the one or more hosts for the memory device to perform the type of computing operation.

20. The non-transitory computer-readable storage medium of claim 10, wherein the processing device is further caused to:

allocate, according to the configuration policy, the total number of virtual functions and the total number of physical functions available for allocation to the one or more hosts using the classification of the workload and the one or more requests from the one or more hosts for the memory device to perform the type of computing operation.

* * * * *